United States Patent [19]

Kotani et al.

[11] Patent Number: 4,908,851
[45] Date of Patent: Mar. 13, 1990

[54] FACSIMILE APPARATUS OPERABLE IN FACSIMILE OR CONVERSATION MODE

[75] Inventors: Matahira Kotani; Masayuki Hachinoda, both of Nara; Toshihiro Matsuda, Higashiosaka; Takashi Nakajiri, Nara; Motohiko Hayashi, Yamatokoriyama, all of Japan

[73] Assignee: Sharp Kabushiki Kaisha, Osaka, Japan

[21] Appl. No.: 250,408

[22] Filed: Sep. 28, 1988

[30] Foreign Application Priority Data

| Sep. 30, 1987 | [JP] | Japan | 62-247630 |
| Sep. 30, 1987 | [JP] | Japan | 62-247631 |
| Sep. 30, 1987 | [JP] | Japan | 62-247632 |
| Sep. 30, 1987 | [JP] | Japan | 62-247633 |
| Sep. 30, 1987 | [JP] | Japan | 62-247634 |

[51] Int. Cl.$^4$ .................... H04M 11/00; H04N 1/32
[52] U.S. Cl. .................... 379/100; 379/93; 379/96; 358/434; 358/436
[58] Field of Search .......... 379/93, 96, 97, 98, 379/100; 358/257, 434, 436

[56] References Cited

U.S. PATENT DOCUMENTS

| 4,584,434 | 4/1986 | Hashimoto | 379/100 |
| 4,660,218 | 4/1987 | Hashimoto | 379/93 |
| 4,677,660 | 6/1987 | Yoshida | 379/100 |
| 4,773,080 | 9/1988 | Nakajima et al. | 379/100 |
| 4,794,637 | 12/1988 | Hashimoto | 379/100 |

OTHER PUBLICATIONS

Japanese Laid-Open Patent Publication #60-203059, Oct. 14, 1985.
Japanese Laid-Open Patent Publication #60-120648, Jun. 28, 1985.
Japanese Laid-Open Patent Publication #61-230567, Oct. 14, 1986.
Japanese Patent Publication #61-230568, Oct. 14, 1986.
Japanese Patent Publication #62-67957, Mar. 27, 1986.
Japanese Patent Publication #62-199156, Sep. 2, 1987.

Primary Examiner—Jin F. Ng
Assistant Examiner—Wing F. Chan
Attorney, Agent, or Firm—Birch, Stewart, Kolasch & Birch

[57] ABSTRACT

A facsimile communication apparatus is disclosed which is operable under either one of a facsimile mode for transmitting facsimile signal from a calling station along a telephone line to a called station, and a conversation mode for sending conversation signal from the calling station along the telephone line to the called station. The facsimile communication apparatus at the called station includes a detector for detecting a facsimile request signal indicative of a facsimile communication request made by a calling station within a predetermined period of time after a telephone line is connected to a facsimile communication apparatus of the calling station, and a signal producer for producing a facsimile request signal when the detector detects the facsimile request signal and for producing a conversation request signal when the detecting means detects no facsimile request signal within the predetermined period of time.

13 Claims, 2 Drawing Sheets

FACSIMILE APPARATUS OPERABLE IN FACSIMILE OR CONVERSATION MODE

BACKGROUND OF THE INVENTION

FIELD OF THE INVENTION

The present invention relates to a facsimile communication apparatus provided with a normal telephone function to exchange conversation.

A facsimile communication apparatus is provided with an automatic line connection function, such that when it is operated as a receiver, it connects the telephone line after several rings and receives the facsimile signal transmitted from a facsimile communication apparatus of a calling station. It has no function of automatically accepting a conversation requested by the calling station over the telephone line.

A facsimile communication apparatus provided with no automatic line connection function may exchange conversation over the telephone line, but a manual operation is required to switch between the conversation mode and the facsimile mode.

There is a growing demand for the development of a facsimile communication apparatus which has an automatic line connection function and also which can automatically change between the facsimile mode and the conversation mode.

To achieve this, a voice signal on the telephone line, automatically at the start of the conversation this method automatically start the conversation, but this method, however, requires a voice detecting means, and thus it results in a high manufacturing cost.

SUMMARY OF THE INVENTION

The present invention has been designed with a view to substantially solving the above-described disadvantage. The essential objective is to provide a facsimile communication apparatus which has a function of automatically accepting a telephone conversation request, as well as a facsimile communication request.

In order to achieve the above-described object, the facsimile communication apparatus, according to the present invention, is operable under either one of a facsimile mode for transmitting facsimile signals from a calling station along a telephone line to a called station, or a conversation mode for sending conversation signals from the calling station along the telephone line to the called station. The facsimile communication apparatus at the called station, according to the present invention, comprises a network control unit for automatically connecting the telephone line thereto upon receipt of a telephone call from the calling station; a timer means for counting a first predetermined period of time; a detecting means for detecting a facsimile request signal (CNG signal) from the calling station within the first predetermined period of time; a facsimile control signals producing means for producing facsimile control signal (CED, NFS, CSI, DIS) when the detecting means detects, within the first predetermined period of time, the facsimile request signal; and a message producing means for producing a message when said detecting means fails to detect, within the first predetermined period of time, the facsimile request signal.

BRIEF DESCRIPTION OF THE DRAWINGS

These and other objects and feature of the present invention will become apparent from the following description taken in conjunction with the preferred embodiment thereof with reference to the accompanying drawings, in which.

DETAILED DESCRIPTION OF THE INVENTION

Figure 1:
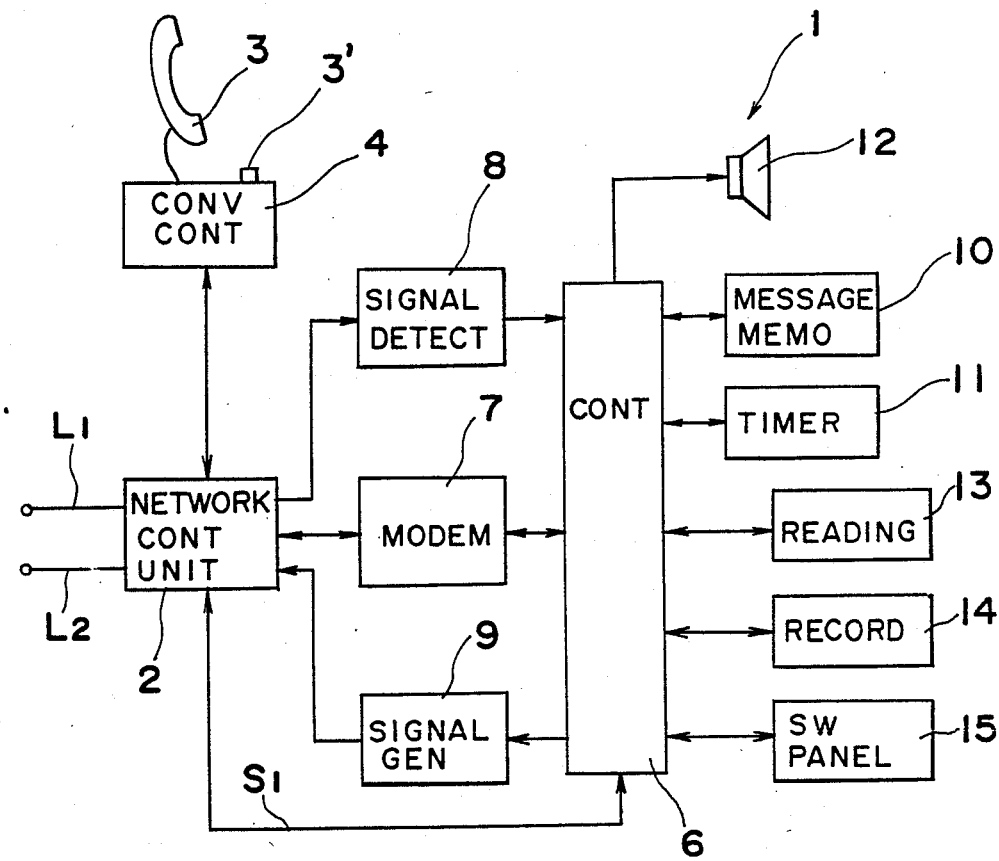
FIG. 1 is a block diagram of a facsimile communication apparatus according to the present invention.

Referring to FIG. 1, a block diagram of a facsimile communication apparatus 1, according to a preferred embodiment of the present invention, is shown. The facsimile communication apparatus 1 has a network control unit 2 connected to an external telephone lines L1 and L2. Circuit network control unit 2 has a function of controlling the line between the external telephone line and the facsimile communication apparatus 1. It also has an automatic line connection function such that facsimile communication apparatus 1 is connected to the telephone lines after several telephone rings, caused by the dialing of the facsimile calling station. The connection of the facsimile communication apparatus with the telephone lines L1 and L2 is accomplished when the polarity of the telephone lines L1 and L2 is changed.

The network control unit 2 is connected to a conversation control unit 4 having a handset 3 and a plunger 3' for the telephone conversation between the calling station and the called station. The network control unit 2 is also connected, through a modem 7, to a control 6 which produces a signal for changing the mode between conversation mode and facsimile mode, as will be further explained later. Modem 7 modulates and demodulates a carrier signal, which the facsimile communication apparatus 1 transmits or receives through the telephone line, between the facsimile communication apparatus of the calling station and that of the called station. More specifically, image signals of an original document transmitted from the facsimile communication apparatus of the calling station are modulated by modem 7, and the image signals are demodulated by modem 7 at the called station.

A signal detector 8 and a signal generator 9 are also provided between network control unit 2 and control 6. The signal detector 8 detects various signals by detecting signal levels and/or signal frequency of different signals transmitted from the calling station through the telephone line. Signal generator 9 produces a control signal to be transmitted to the calling station in response to a signal outputted from the control 6. Network control unit 2 and control 6 are connected to each other by a line S1 such that when the polarity of the telepone lines L1 and L2 is changed, in response to the telephone line connection, the network control unit 2 produces and applies a signal representing the line connection along line S1 to control 6.

Connected to the control 6 are a message memory 10, a timer 11, a speaker 12, a document reading unit 13, and recording unit 14 and a switch panel 15 including dial keys. The message storing unit 10 stores predetermined message data, such as "calling operator", which can be phonetically reproduced. Timer 11 counts a first predetermined time period T1 (such as 5 seconds) and a second predetermined time period T2 (such as 15 seconds), which will be described in detail later. The speaker 12 is provided for phonetically producing a message stored in message memory, or tone signal requesting the conversation. The document reading unit 13 is provided for optically reading an image of an original document to be transmitted through facsimile, and a recording unit 14 is provided for recording the received image signal transmitted from the calling station.

Figure 2:
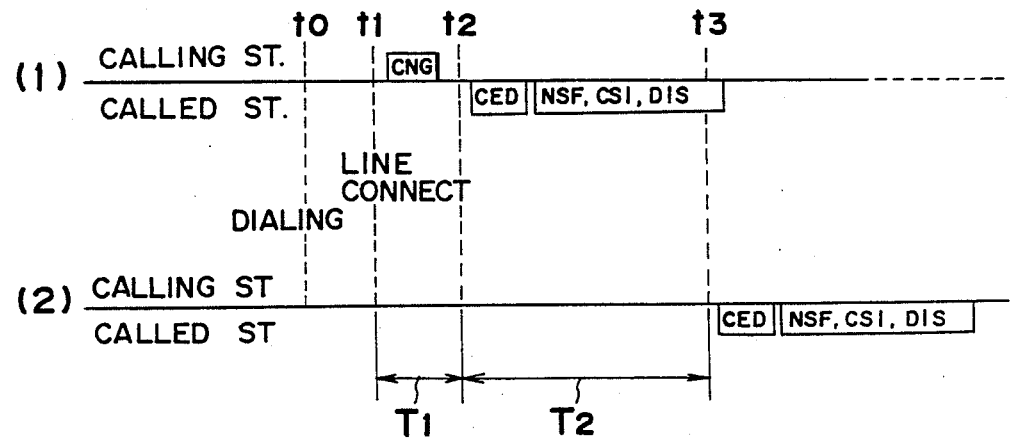
FIG. 2 is a timing chart showing the operation of the facsimile communication apparatus of FIG. 1.

FIG. 2 is a timing chart showing an operation of an automatic mode selection between a facsimile mode and a telephone conversation mode, either one of which can be performed by the facsimile communication apparatus 1 of FIG. 1. In FIG. 2, time chart (1) shows a case when the calling station dials the destination station by the auto-dial system requesting only the facsimile transmission and no conversation request, and time chart (2) shows a case when the calling station dials the destination station after the handset is picked up for requesting the conversation.

First, the operation will be described in connection with time chart (1) in FIG. 2. At time t0, the automatic dialing system is affected, in the calling station, to automatically dial the telephone number of the destination station. Thereupon, the calling ring is produced at the destination station, i.e., called station. At the called station, when the telephone bell rings a predetermined number of times, the automatic telephone line connection function is activated by the network control unit 2. This occurs such that, at time t1, the polarity of telephone lines L1 and L2 is changed to connect the called station with the calling station through telephone line L1 and L2. Also, at time t1, network control unit 2 generates a signal along line S1 in response to the change of the polarity, which is applied to control 6. Thereupon, using timer 11, control 6 starts to count the first predetermined time period T1 (such as 5 seconds).

In the case of time chart (1), since the calling station is requesting the facsimile signal transmission, the calling station sends, immediately after the line connection, a facsimile request signal (referred to as a CNG signal). This is defined by a calling tone of 1100 Hz that continues for 0.5 second and repeated with an interval of 3 seconds. The CNG signal is usually produced by the autodial system. Within the first predetermined time period T1, the called station detects the CNG signal by the detector 8, thereby starting necessary steps to start the facsimile signal transmission. More specifically, after time t2, i.e., after counting the first predetermined time period T1, the called station produces and sends a called station identification signal (referred to as CED signal) to the calling station. The CED signal is defined by a tonal signal of 2100 Hz which continues for 2.6 seconds to 4 seconds. By the receipt of the CED signal, the calling station is informed that the facsimile transmission may be started. After the CED signal, the called station further produces and sends the following control signals to the calling station in the following order: non-standard facilities signal (NFS signal 0000 0100), a called station identification signal (CSI signal 0000 0010), and a digital identification signal (DIS signal 0000 0001). Thereafter, the image information of the original document is transmitted from the facsimile communication apparatus of the calling station, and the same is received by the facsimile communication apparatus of the called station. The above-described control signals, including the CED signal, are produced by the signal generator 9 as explained below.

When the signal detector 8 detects the CNG signal received by the network control unit 2, signal detector 8 produces and sends a signal indicative of the receipt of the CNG signal to the control 6. In response to this signal, control unit 6 outputs a signal to the signal generator 9, indicating that the above-described control signals should be produced. In response to this signal, the signal generator 9 generates the control signals in the order as described above. The control signals are further transmitted from the network control unit 2 to the facsimile communication apparatus of the calling station through the telephone line.

Next, the operation is described in connection with time chart (2) of FIG. 2. At time t0, to request the conversation, an operator at the calling station picks up the handset 3 and dials the telephone number of the destination station. Thereupon, the calling ring is produced at the destination station, i.e., called station. At the called station, when the telephone bell rings a predetermined number of times, the automatic telephone line connection function is activated by the network control unit 2 to connect the called station with the calling station through telephone lines L1 and L2. Also, at time t1, network control unit 2 generates a signal along line S1 in response to the change of the polarity, which is applied to control 6. Thereupon, using timer 11, control 6 starts to count the first predetermined time period T1 (such as 5 seconds).

In the case of time chart (2), since the calling station is operated, not by the automatic dialing system, but by manual dialing operation, no CNG signal is produced, during or even after the first predetermined time period T1. Therefore, during the first predetermined time period T1, no CNG signal will be detected by the signal detector 8. Then, during the next predetermined time period T2, as counted by timer 11, a message, such as "conversation request" as stored in message memory 10 is read out and is reproduced phonetically through speaker 12 in the called station. At the same time, the same message is transmitted through the telephone line to the calling station. In this manner, the people in the calling station will be informed that the person at the called station is requesting the conversation and, at the same time, the person at the calling station holding the handset is informed the "conversation request" is being announced repeatedly at the called station.

In the above example, the message announced at the called station and the message heard at the calling station are the same, but they can be different, such that the calling station may hear the ringing sound. By producing some signal or message on the telephone at the calling station, the person requesting the conversation will know that the "conversation request" is being continued.

When somebody at the called station responds to the "conversation request" within time period T2 by holding up the handset 3, enabling the projection of plunger 3', or by depressing a conversation button (not shown) provided in switch panel 15, control 6 produces a mode change signal to network control unit 2. Thereupon, network control unit 2 changes the mode from facsimile mode to conversation mode, thereby enabling the conversation between the calling and called stations.

If, at the called station, nobody answers the telephone announcement "conversation request" within time period T2, the announcement stops and the facsimile transmission procedure continues. Thus, in this case, when time period T2 elapsed, the CED signal and the other control signals mentioned above are produced from the called station and transmitted to the calling station. This method for starting the facsimile communication is adopted to accomplish a facsimile communication requested by a facsimile communication apparatus employing the manual dialing operation system.

According to the facsimile communication which is to be performed by the facsimile communication apparatus employing the manual dialing operation system, the person at the calling station, who has been waiting for somebody to answer the telephone but in vein, presses the transmission start key after the lapse of time period T2. Thus, he can confirm the receipt of the CED signal indicating that the facsimile communication procedure has been started. Therefore, in this case, no CNG signal is produced by the signal transmitting unit 9. That is, if the telephone call is not answered by the called station during the second time period T2, the operator of the calling station can start the facsimile communication procedure.

Figure 3:
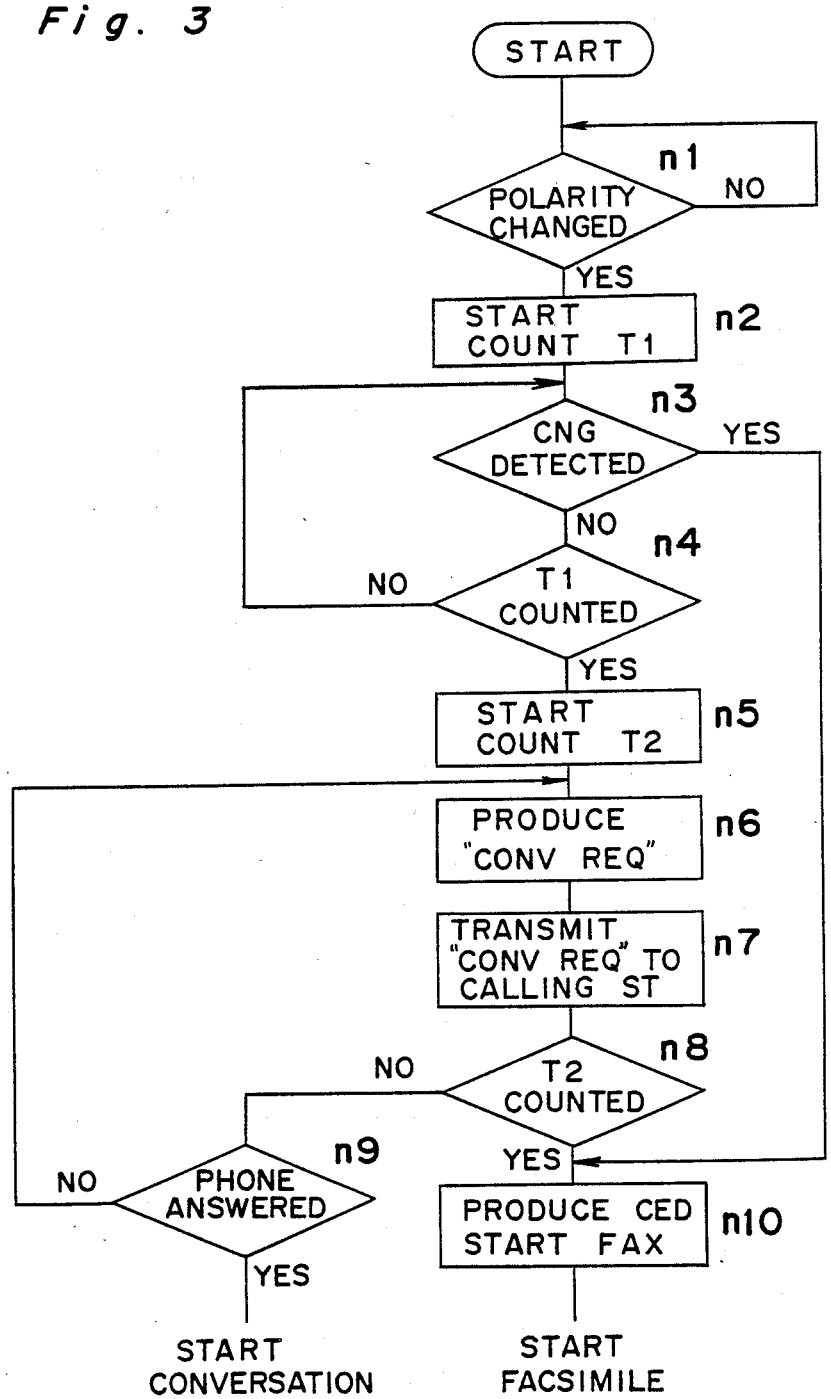
FIG. 3 is flowchart for showing an operation of the facsimile communication apparatus of FIG. 1.

Referring to FIG. 3, a flowchart shows the operation of control 6 of the facsimile communication apparatus of the present invention.

When the change of the polarity of the telephone lines L1 and L2 is detected by network control unit 2 at step n1, the counting of the first predetermined time period T1 starts at step n2.

It is determined at step n3 whether or not the CNG signal has been detected. If yes, the program goes to step n10 at which time the CED signal is transmitted to the calling station and a facsimile communication procedure starts. If no, the program goes to step n4 at which it is determined whether or not the first predetermined time period T1 is counted. If no, the program goes back to step n3. If yes, the program advances to step n5.

At step n5, timer 11 starts to count the second predetermined time period T2. At step n6, a conversation request message is produced phonetically by speaker 12. At step n7, the conversation request message is transmitted to the calling station through the telephone lines.

At step n8, it is determined whether or not the second predetermined time period T2 is counted. If no, the program goes to step n9.

At step n9, it is detected whether or not handset 3 is lifted, i.e., it is decided whether or not plunger 3' has been projected. If yes, that is, if somebody at the called station picks up the handset or depresses the conversation start button, then it is possible to start a conversation between the persons on the telephones at the calling station and the called station. If nobody answers the telephone within the time period T2 at the called station, the program goes back to step n6.

If it is detected at step n8 that the second time period T2 is counted, the program goes to step n10 at which the CED signal is transmitted to the calling station and a facsimile communication procedure starts.

According to the present invention, the facsimile communication apparatus, provided with the automatic line connection function, may accept either the facsimile transmission or conversation, and yet it may accept the facsimile telephone call from the automatic dialing system or from the manual dialing system. Thus, the facsimile communication apparatus, according to the present invention, is widely applicable in this field.

It is to be noted that, instead of producing the announcement "conversation request" at step n6, it is possible to produce a simple sound signal, such as a buzzard or ring, which is distinguishable over the normal telephone ring.

It is also to be noted that, after the second time period T2, when nobody answers the conversation request, it is possible to automatically disconnect the facsimile communication apparatus of the called station from the telephone line by actuating the network control unit by the control 6.

As is apparent from the foregoing description, the facsimile communication apparatus provided with the automatic line connection function, according to the present invention, is applicable both to facsimile communications and telephone calls.

Although the present invention has been fully described in connection with a preferred embodiment thereof with reference to the accompanying drawings, it is to be noted that various changes and modification are apparent to those skilled in the art. Such changes and modifications are to be understood as included within the scope of the present invention as defined by the appended claims unless they depart therefrom.

What is claimed is:

1. A facsimile communication apparatus which is operable under either one of a facsimile mode for transmitting facsimile signals from a calling station along a telephone line to a called station, or a conversation mode for transmitting voice signals from the calling station along the telephone line to the called station, said facsimile communication apparatus at the called station comprising:

network control means for automatically connecting said called station to said telephone line upon receipt of a telephone call from the calling station;

timer means for counting a first predetermined time period, said timer means being activated in response to the automatic connection by said network control means;

detecting means, operatively connected to said timer means, for detecting if a facsimile request signal from the calling station is present within said first predetermined time period;

facsimile control signal producing means, responsive to said detecting means, for producing facsimile control signals when said detecting means detects said facsimile request signal within said first predetermined time period, thereby enabling the facsimile mode;

said timer means counting a second predetermined time period in response to said facsimile request signal not being detected by said detecting means within said first predetermined time period;

message producing means, responsive to lapse of said first predetermined time period, for producing a message, at said called station, indicating that an operator at said calling station desires said facsimile apparatus to operate in said conversation mode; and conversation control means, responsive to said message producing means, for producing a control signal to enable said facsimile apparatus to operate in the conversation mode, within said second predetermined time period;

wherein said facsimile control signal producing means responsive to said timer means for producing facsimile control signals upon the lapse of said second predetermined time period, thereby enabling said facsimile mode.

2. An apparatus, as claimed in claim 1, wherein said message producing means comprises:

memory means for storing a predetermined message;

control means for outputting said message from memory; and speaker means, responsive to said control means, for outputting said message in an audible form at said called station.

3. An apparatus, as claimed in claim 2, wherein said message is a "conversation request" message, thereby indicating to an operator at the called station that an operator at the calling station desires the facsimile apparatus to operate in the conversation mode.

4. An apparatus, as claimed in claim 1, wherein said conversation control means comprises:

a telephone handset; and a plunger, whereby when the handset is lifted the plunger is raised thereby producing said control signal to enable said facsimile apparatus to operate in said conversation mode.

5. A facsimile communication apparatus which is operable under either one of a facsimile mode for transmitting facsimile signals from a calling station along a telephone line to a called station, or a conversation mode for sending conversation signals from the calling station along said telephone line to the called station, said facsimile communication apparatus at the called station comprising:

network control means for automatically connecting said called station to the telephone line upon receipt of a telephone call from the calling station;

timer means for counting a first predetermined period of time;

detecting means for detecting if a facsimile request signal from the calling station is present within said first predetermined period of time;

facsimile control signal producing means for producing facsimile control signals when said detecting means detects, within said first predetermined period of time, said facsimile request signal;

said timer means further counting a second predetermined period of time subsequent to the counting of said first predetermined period of time;

message producing means for producing a message, within said second predetermined time period, when said detecting means fails to detect, within said first predetermined period of time, said facsimile request signal; and said facsimile control signal producing means produces said facsimile control signals after counting said second predetermined period of time, when an operator at said called station fails to respond to said message, within said second predetermined period of time to thereby enable the facsimile mode.

6. A facsimile communication apparatus as claimed in claim 5, wherein said network control unit disconnects said telephone line therefrom after counting said second predetermined period of time, when said detecting means fails to detect, within said first predetermined period of time, said facsimile request signal.

7. A facsimile communication apparatus as claimed in claim 5, wherein said message producing means comprises message memory means for storing a predetermined message and speaker means for phonetically producing said message.

8. A facsimile communication apparatus as claimed in claim 5, wherein said message producing means produces message in a form of announcement.

9. A facsimile communication apparatus as claimed in claim 5, wherein said message producing means produces message in a form of simple sound.

10. An apparatus, as claimed in claim 5, further comprising:

conversation control means for producing a control signal when an operator at the called station responds to said message, within said second period of time, thereby enabling said converstion mode.

11. An apparatus, as claimed in claim 10, wherein said conversation control means comprises a telephone with a receiver, which, when said operator picks up said receiver, generates said control signal.

12. A method of enabling a facsimile apparatus to operate in either one of a facsimile mode for transmitting facsimile signals from a calling station along a telephone line to a called station, or a conversation mode for transmitting voice signals from the calling station along the telephone line to the called station, said method comprising the steps of:

automatically connecting said called station to said telephone line upon receipt of a telephone call from the calling station;

counting a first predetermined time period, in response to said automatic connection;

detecting if a facsimile request signal from the calling station is present within said first predetermined time period;

producing facsimile control signals when said facsimile request signal is detected within said first predetermined time period, thereby enabling the facsimile mode;

counting a second predetermined time period in response to said facsimile request signal not being detected within said first predetermined time period;

producing a message, at said called station after lapse of said first predetermined time period, indicating that an operator at said calling station desires said facsimile apparatus to operate in said conversation mode;

producing a control signal to enable said facsimile apparatus to operate in the conversation mode, if, within said second predetermined time period an operator at the called station responds to said message; and producing facsimile control signals upon the lapse of said second predetermined time period, thereby enabling said facsimile mode.

13. A method, as claimed in claim 12, wherein said operator at the called station responds to said message by lifting a handset of his telephone, thereby producing said control signal.

* * * * *